United States Patent [19]
Rockenfeller et al.

[11] Patent Number: 5,335,515
[45] Date of Patent: Aug. 9, 1994

[54] TRIPLE EFFECT ABSORPTION CYCLE APPARATUS

[75] Inventors: Uwe Rockenfeller; Paul Sarkisian, both of Boulder City, Nev.

[73] Assignee: Rocky Research, Boulder City, Nev.

[21] Appl. No.: 47,625

[22] Filed: Apr. 14, 1993

Related U.S. Application Data

[63] Continuation of Ser. No. 800,636, Nov. 27, 1991, abandoned.

[51] Int. Cl.$^5$ .............................................. F25B 7/00
[52] U.S. Cl. ....................................... 62/476; 62/101; 62/112
[58] Field of Search .................. 62/476, 483, 101, 112

[56] References Cited

U.S. PATENT DOCUMENTS

| | | | |
|---|---|---|---|
| 3,316,728 | 5/1967 | Biermann | 62/112 |
| 3,452,550 | 7/1969 | Dyre | 62/85 |
| 3,541,013 | 11/1970 | Macriss | 252/69 |
| 3,593,540 | 7/1971 | Hopkins | 62/476 |
| 3,742,728 | 7/1973 | Mamiya | 62/476 |
| 3,783,631 | 1/1974 | Modahl | 62/112 |
| 3,928,983 | 12/1975 | Ainbinder | 62/101 |
| 3,949,566 | 4/1976 | Hopkins | 62/475 |
| 3,977,204 | 8/1976 | Bourne | 62/85 |
| 4,315,411 | 2/1982 | Vardi | 62/112 |
| 4,333,515 | 6/1982 | Wilkinson | 165/1 |
| 4,520,634 | 6/1985 | Ooucih et al. | |
| 4,531,374 | 7/1985 | Alefeld | 62/79 |
| 4,551,991 | 11/1985 | Miyoshi et al. | 62/476 |
| 4,637,218 | 1/1987 | Tohernev | 62/106 |
| 4,732,008 | 3/1988 | DeVault | 62/79 |
| 4,827,728 | 5/1989 | DeVault et al. | 62/79 |
| 4,921,515 | 5/1990 | Dao | 62/335 |
| 5,033,274 | 7/1991 | Erickson | 62/476 |

FOREIGN PATENT DOCUMENTS

| | | |
|---|---|---|
| 278076 | 9/1914 | Fed. Rep. of Germany . |
| 9012848 | 11/1990 | PCT Int'l Appl. . |
| 1208467 | 10/1970 | United Kingdom . |

*Primary Examiner*—Albert J. Makay
*Assistant Examiner*—William C. Doerrler
*Attorney, Agent, or Firm*—Jerry R. Seiler

[57] ABSTRACT

The basic apparatus of the invention is a triple effect absorption cycle apparatus, comprising first, second and third generators each containing an aqueous absorption fluid and operating at successively higher temperatures; first, second and third condensers operating at successively higher temperatures, and operatively communicating with the generators; first heat exchange means cooperating between the third condenser and second generator, and between the second condenser and first generator, for directing energy therebetween; one, two or three absorbers and one, two or three fluid loops for directing aqueous absorption fluid between absorbers and second heat exchange means for exchanging energy between aqueous absorption fluid flows in said loops; and one, two or three evaporators operatively communicating with the absorbers. The includes preferred aqueous absorption fluids, a heat and mass transfer additive in the absorption fluid, means for separating the additive before the fluid reaches the high temperature generator, a heat and mass transfer additive reservoir, and a number of different absorption fluid loop options for routing the fluid between the absorber(s) and the three generators.

61 Claims, 8 Drawing Sheets

TRIPLE EFFECT ABSORPTION CYCLE APPARATUS

This application is a continuation of application Ser. No. 07/800,636, filed Nov. 27, 1991.

BACKGROUND OF THE INVENTION

Concerns about the environmental impact of fluorocarbons and hydrofluorocarbons on the environment call for expanded uses of environmentally sound refrigerants, such as water or ammonia. For commercial chiller applications in the capacity range of 15–10,000 refrigeration tons with little heating requirements, water is usually the preferred refrigerant due to its non-flammable and benign nature.

Aqueous absorption fluid cycles taking advantage of such refrigerants have been known and used for many decades. Single effect and various two-stage designs are commercially used in many countries. However, the increasing concern about the overall $CO_2$ generation in the process of converting fossil fuels into energy used for air conditioning or refrigeration calls for higher energy conversion efficiencies than currently obtained with single stage (COP=0.6 to 0.8) or two-stage (COP=0.9 to 1.25) absorption equipment.

U.S. Pat. No. 4,732,008 teaches the use of two single stage cycles coupled to achieve three refrigeration effects. The independent loops carry different absorption fluids with the lower stage using fluids such as aqueous LiBr solutions. However, the needed upper stage fluid crystallization and vapor pressure suppression properties require the use of a different fluid. Performance estimates lead to COPs of 1.5 to 1.7 if suitable upper stage fluids are used.

SUMMARY OF THE INVENTION

The present invention is for an apparatus having three refrigeration effects in which either a single aqueous absorption fluid or two or three different absorbents or different absorbent concentrations with a single refrigerant, i.e. water, are used throughout the system. Thus, because such a single refrigerant, water, is used as the refrigerant or working fluid solvent throughout the system, regardless of the stage, the invention offers a substantial improvement over prior art triple effect systems which rely solely on heat transfer coupling of three heat exchangers with no common mass flows. The apparatus and systems of the invention result in COPs similar to those used in the aforesaid two single stage cycle triple effect apparatus. However, because peak operating temperatures are lower than in such a dual loop system, the temperature lift and fluid crystallization requirements of the fluid composition in the third stage generator are reduced. These as well as other advantages of the apparatus in the system will be evident in the following description.

DETAILED DESCRIPTION OF THE INVENTION

Figure 1:
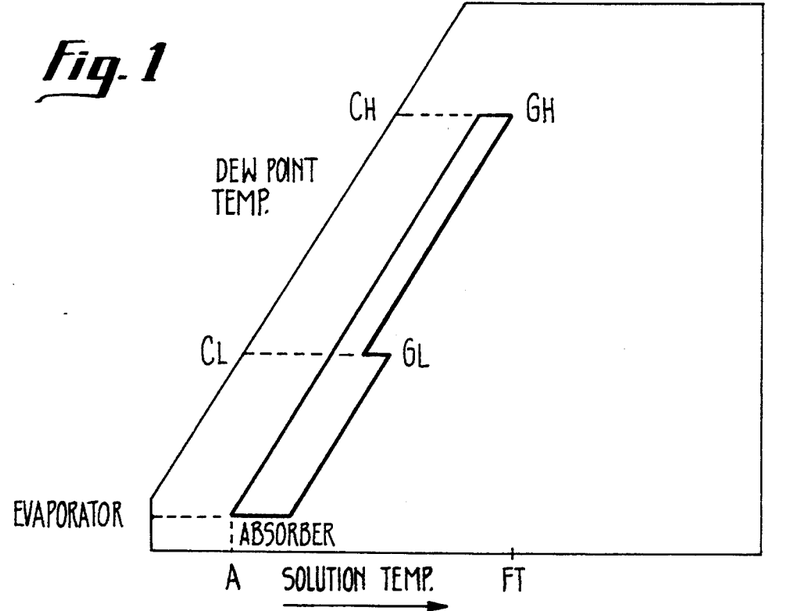
FIG. 1 shows a conventional double effect absorption cycle phase diagram of the type typically resulting from an aqueous LiBr absorption working fluid.

As previously noted, FIG. 1 shows a conventional double effect absorption cycle using a typical aqueous LiBr working fluid solution. Condenser heat generated by condensing water vapor from the high temperature generator $G_H$ is used to drive the lower stage generator $G_L$, which in turn releases water vapor which is condensed with conventional cooling means, such as evaporative condensers, cooling towers or air coolers. The firing temperature FT is typically between about 300° F.–380° F., the absorber temperature A is typically between about 80°–110° F., evaporator temperature between about 40° F.–45° F., and low temperature condenser $C_L$ is between about 80°–110° F.

Figure 2:
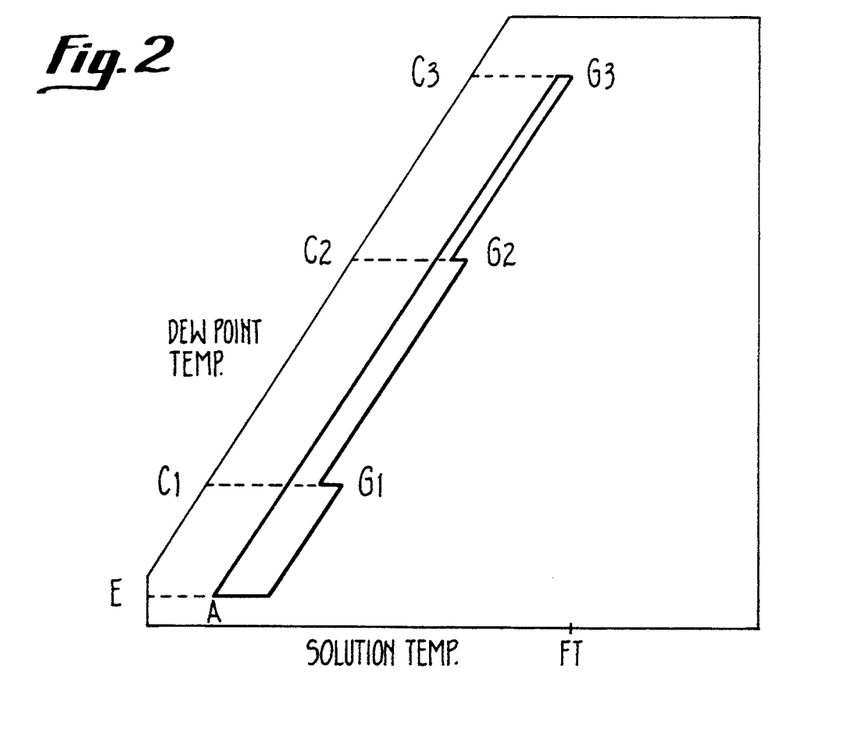
FIG. 2 shows a triple effect absorption cycle phase diagram according to one embodiment of the present invention.
Figure 8:
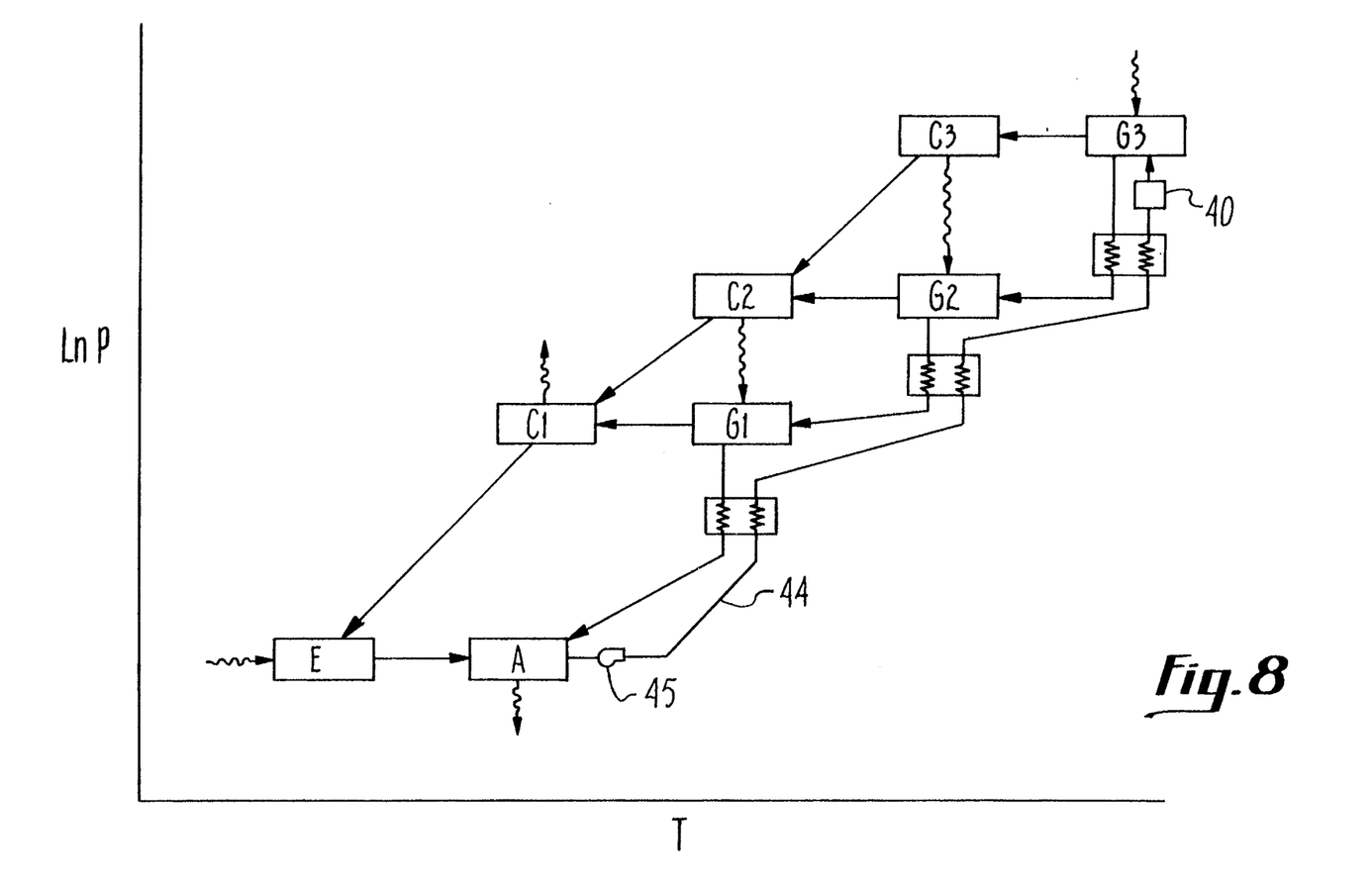

A phase diagram of a triple effect absorption cycle of the invention is illustrated in FIG. 2. The cycle shown illustrates three generators, high temperature, medium temperature, and low temperature, $G_3$, $G_2$, and $G_1$, respectively, and high, medium, and low temperature condensers, $C_3$, $C_2$, $C_1$, respectively. Firing temperatures FT are typically between about 400° F. and 520° F., and minimally between about 390° F. and 420° F. A schematic illustration of an apparatus of the invention having such an absorption cycle is illustrated in FIG. 8. In such an apparatus, a high temperature, third stage generator $G_3$ is used to generate water vapor of sufficient pressure and temperature to condense water refrigerant such that the heat of condensation can be used to drive the medium stage generator $G_2$, which in turn generates vapor to be condensed at sufficient temperature to drive the lower, first stage generator $G_1$, which in turn generates refrigerant vapor which is condensed with conventional cooling and heat rejection means. The heat exchange between condenser $C_3$ and generator $G_2$ can be achieved with phase change heat transfer using an appropriate phase change heat transfer fluid capable of operating in the approximate temperature range of 300° F. to 400° F. Alternatively, a pumped loop of heat exchange fluid for sensible heat transfer may be used. Similarly, heat exchange between condenser $C_2$ and generator $G_1$ may be achieved with either a phase change heat transfer in the approximate temperature range of about 150° F. and 275° F. or by a pumped loop for a heat exchange fluid. The aforesaid temperature ranges are approximate, and will depend on the thermal load on the equipment, as well as ambient reject temperatures which change during the day as well as the season. Typical reject temperature equipment designs are in the range of 90° F. to 95° F. for water cooled equipment, and approximately 25° F. higher for air cooled systems.

Figure 5:
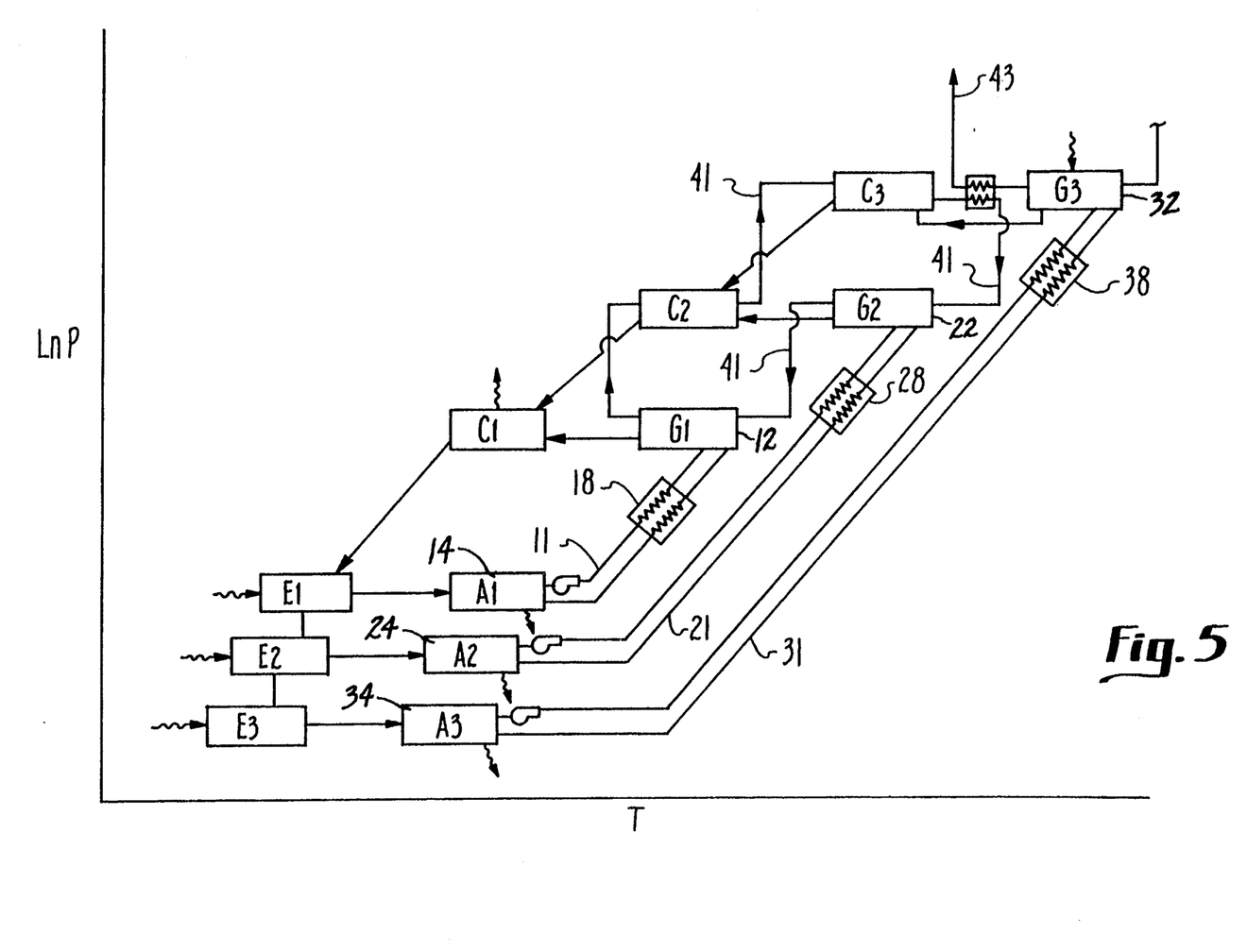
FIG. 5 is a schematic illustration of a three generator, three absorber system configuration according to the invention using three separate absorption fluid loops.

Because a single refrigerant, water, is used in the aqueous absorption fluids of the invention, there is provided a substantial number of different apparatus configurations, using different absorption fluid loop options as are illustrated in the apparatus examples of FIGS. 5-11. FIG. 5 illustrates schematically an apparatus embodiment of the invention incorporating three absorber-generator pairs and using three separate aqueous absorption loops between each pair. Thus, fluid loop 11 directs aqueous absorption fluid between first stage absorber 14 ($A_1$) and generator 12 ($G_1$), loop 21 between second stage absorber 24 ($A_2$) and generator 22 ($G_2$), and loop 31 between third stage absorber 34 ($A_3$) and generator 32 ($G_3$). Heat exchangers 18, 28, and 38 in each of the aforesaid working fluid loops heat the relatively dilute salt solution pumped from the absorbers to the generators, and cool the relatively concentrated solution directed from the generator back to the absorber. The specific fluid loop couplings between the absorbers and generators are not limited to those as shown and any absorber could be coupled with any generator. Moreover, any of the three evaporators $E_1$, $E_2$ and $E_3$ could communicate independently with condenser $C_1$, or could be coupled together, as shown.

The generator/condenser heat couplings are quite important in the systems of the invention since the efficiency of a cycle depends substantially on effective heat transfer to the lower stages. Accordingly, it may be advantageous to use a heat transfer fluid loop 41 in which a heat transfer fluid is routed for being successively heated by medium stage condenser $C_2$ followed by high temperature condenser $C_3$, and successively cooled by generator $G_2$ and generator $G_1$. Excess heat available from heating means for driving generator $G_3$ may also be introduced into the fluid loop by heat exchange conduit 43.

The operating temperatures of third temperature stage generator $G_3$ are higher than temperatures currently used in double effect equipment. While direct fired high temperature generator heating may be more economical, occurrence of hot spots on the generator surface in contact with the absorption fluid are to be avoided to prevent corrosion acceleration and an increase in material incompatibility. Accordingly, indirect heating whereby burner flames are not in contact with the high temperature generator, such as using a phase change or pumped fluid loop, may be preferred. Moreover, regardless of the method of heating generator $G_3$, any remaining energy or sensible heat below $G_3$ temperature which is unavailable for heating generator $G_3$, is advantageously used for combustion air pre-heating, or, for being directed to one or both of the lower stage generators. Thus, if a pumped fluid loop is used to provide generator $G_3$ with energy, it may be combined with a pumped loop linking the lower generators and condensers, as previously described, or combined to link one of the communicating condenser/generator components, leaving the other generator/condenser set with an individual heat transfer loop. Moreover, although it is thermodynamically disadvantageous to operate a fluid loop at lower temperatures than necessary with heat transfer fluid reheating requirements using high second law availability heat, for example, gas combustion heat or high pressure steam, the aforesaid loop routing may simplify hardware needs and pump requirements and therefore have a cost advantage. Excess heat may also be used to provide hot water heating as commonly provided in current chiller-heater systems.

Figure 3:
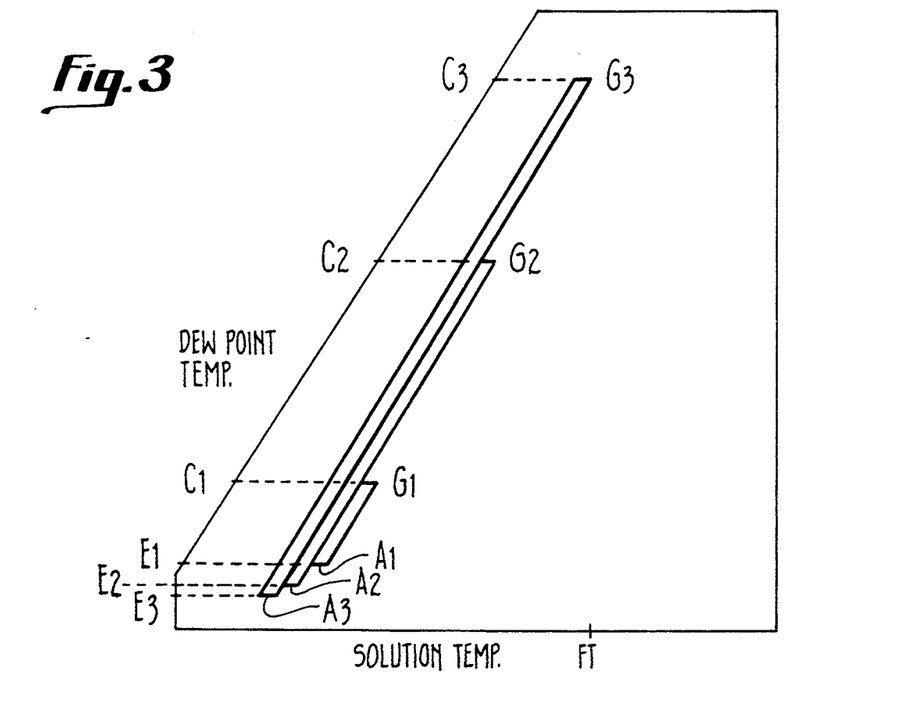
FIG. 3 is a phase diagram of a system of the invention incorporating three evaporators operating with three absorbers.
Figure 4:
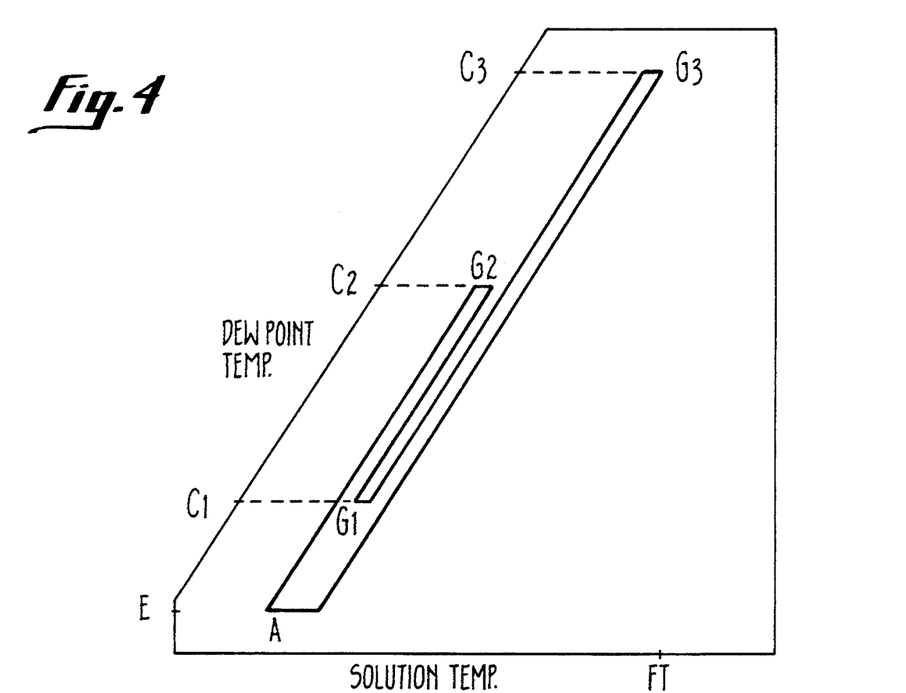
FIG. 4 shows another phase diagram according to an embodiment of the invention using a different routing for the working fluid through the three generators.

The absorber and evaporator portions of the systems of the invention may either be single or multiple units, respectively. The use of multiple evaporators and multiple absorbers as illustrated in the apparatus of FIG. 5 and the cycle diagram of FIG. 3 is particularly advantageous if fluid crystallization limits endanger safe operation of the cycle in the liquid solution field. In the embodiments illustrated, the salt concentration increases as the temperature level increases. Thus, salt concentration of absorber $A_3$ is low compared to absorber $A_2$, which is also relatively low compared to absorber $A_1$. Likewise, the respective absorber operating temperatures are also higher in the higher concentration absorbers. Additionally, the evaporators are operated at different temperatures, with the highest temperature evaporator $E_1$ cooperating with absorber $A_1$ handling the highest absorbent concentration fluid, and similarly, the lower temperature evaporators accordingly communicating with the more dilute solution absorbers. The use of different evaporator temperatures, typically in the range of about 37° F. to 60° F., requires proper routing of the heat transfer fluid used to provide cooling to the load. For example, if a building is cooled with a cold water distribution system, often referred to as chilled water loop, the return flow heated by the building load first enters the highest temperature evaporator heat exchanger, and is then routed to successively lower temperature evaporators. Although the system of the invention incorporates up to three evaporators, other apparatus configurations using different absorber-/evaporator pairs may be used without increasing the number of generators by using more than one evaporator to communicate with a generator via one or more absorbers. However, excessive equipment costs may dictate a practical limit to be reached with two to three evaporator temperature levels. The system shown may also be modified by providing direct flow between $C_1$ and either or both evaporators $E_2$ and $E_3$ rather than only with $E_1$. It may also be advantageous to operate multiple evaporators at substantially the same temperature if component location in the equipment is an important factor, which may be particularly advantageous in multi-zone buildings with substantially the same working temperature requirements. Moreover, the use of multiple absorbents is not limited to absorber operation with different absorbent concentrations or different operating pressures or different operating temperatures.

Because a single refrigerant is used in the system of the present invention, a substantial variation in proportions of fluid flow between the generators and the one or more absorbers is available, with different flow selection options available depending on the operating conditions, loads and specific temperatures encountered. For example, the high temperature generator $G_3$ may generate sufficient refrigerant to condense at $C_3$ such that the latter can feed $G_2$ as well as portions of $G_1$ requirements. Moreover, if $C_3$ energy is insufficient to drive generator $G_2$ alone, flue gas from the combustion system, or heat transfer medium passing through generator $G_3$ exhaust may be used. The aforesaid configurations are understood to be only examples of different types of various design options and are not intended to limit the scope of the invention.

Figure 6:
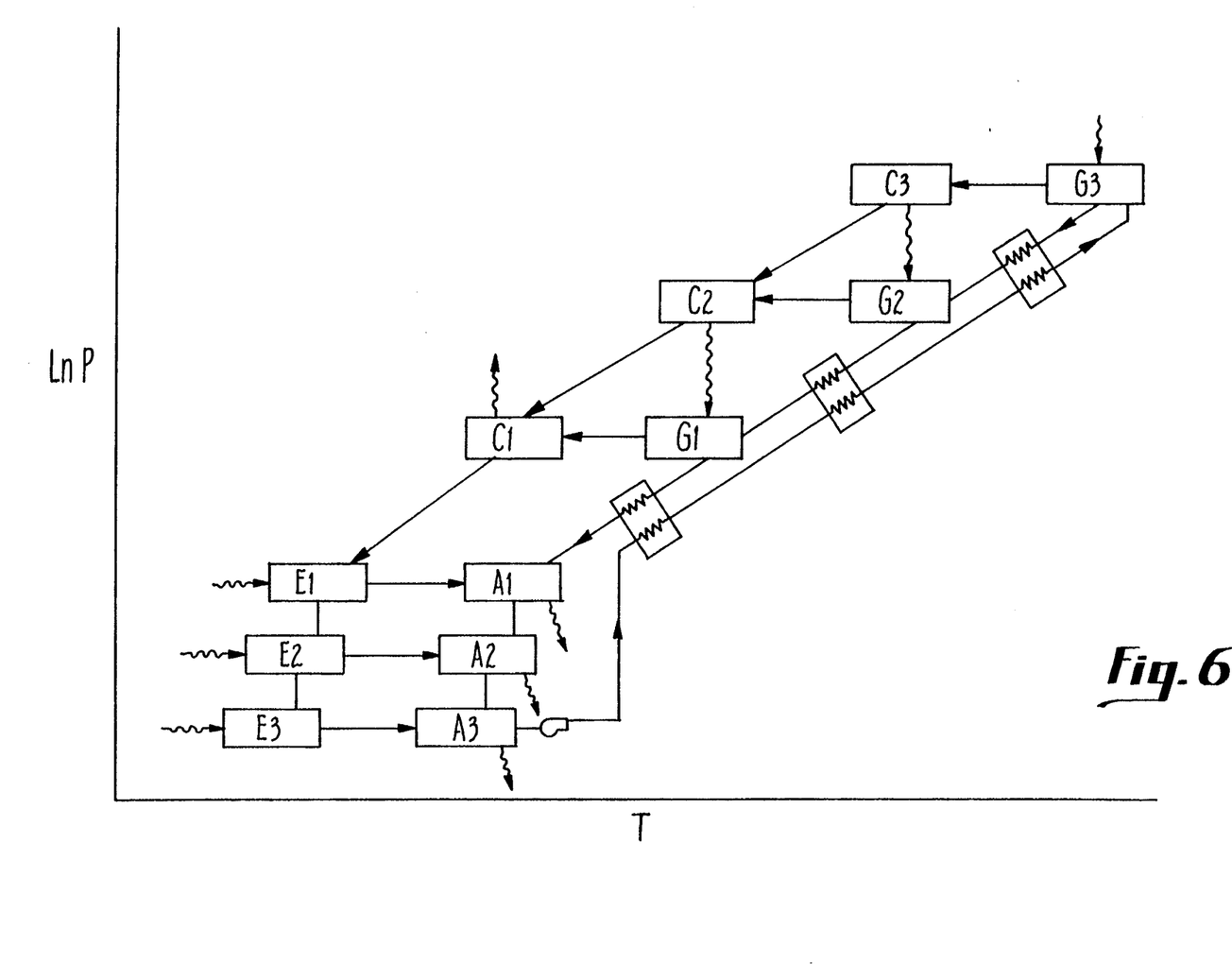
FIG. 6 schematically illustrates another system of the invention incorporating three generators and three absorbers with a single absorption fluid loop.

FIG. 6 illustrates a system using a single absorbent fluid loop with three absorbers, communicating in series. The advantage of this apparatus configuration over that shown in FIG. 5 is the requirement for only a single absorption fluid loop pump. With the three absorbers coupled in series along the single absorption fluid loop, as shown, the salt concentration is successively decreased between $A_1$, $A_2$ and $A_3$. Another useful alternative is to connect the three absorbers in parallel using a conduit from each absorber drawing absorption fluid concurrently from all three absorbers to a single pump supplying, the fluid to $G_3$. Again, although three evaporators are shown, only one or two need to be used, as well as their coupling options, as previously explained. For a loop that has to operate directly between one or more absorbers and a third stage generator, a two stage pump, or two single stage pumps operating in series, may be desirable because of the higher than usual pressure different between those components.

Figure 7:
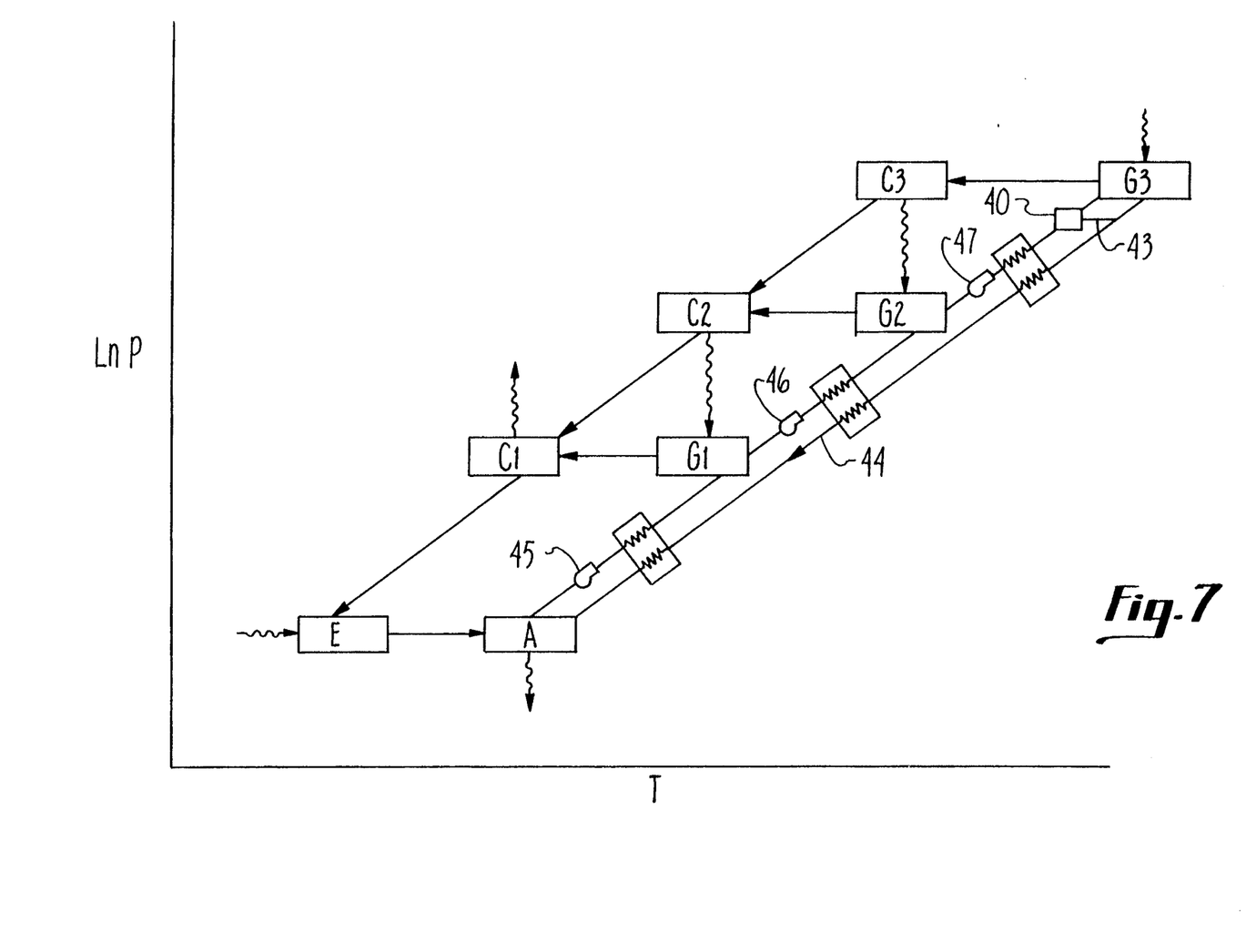
FIGS. 7–10 schematically illustrate different embodiments of three generator, one absorber system configurations of the invention.

FIG. 7 illustrates an embodiment of the system of the invention in which the absorption fluid flow is routed successively through generators $G_1$, $G_2$, and $G_3$ starting with the lowest absorbent concentration leading to the highest concentration using a solution loop 44 and requiring three pumps 45, 46 and 47 in the loop between the single absorber and all three generators. Alternatively, two absorbers may be used with a single solution loop feeding generator $G_1$, operating in parallel with similar refrigerant concentrations. In such a system, one evaporator for the two or more absorbers or two evaporators for two or three absorbers, or one evaporator for each of the absorbers, may be used. Thus, regardless of the number of absorbers, two or three loops, with two or three pumps, may be used, such that each generator is fed with its individual solution flow, or two loops may be used for three generators, or the return flows combined.

Figure 9:
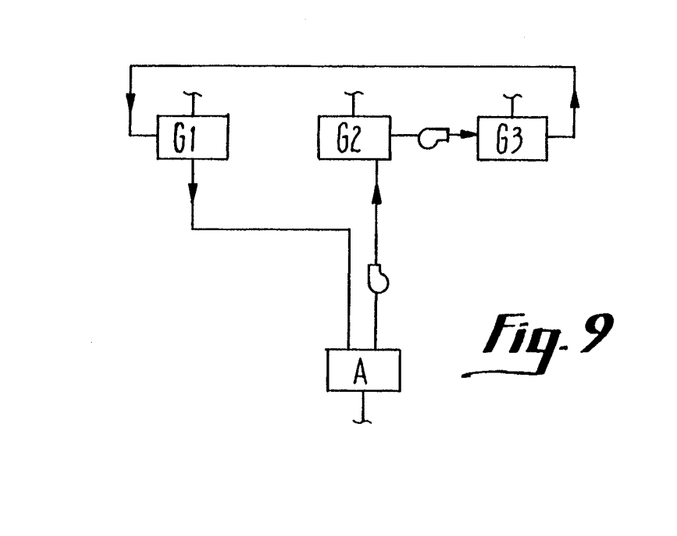
Figure 10:
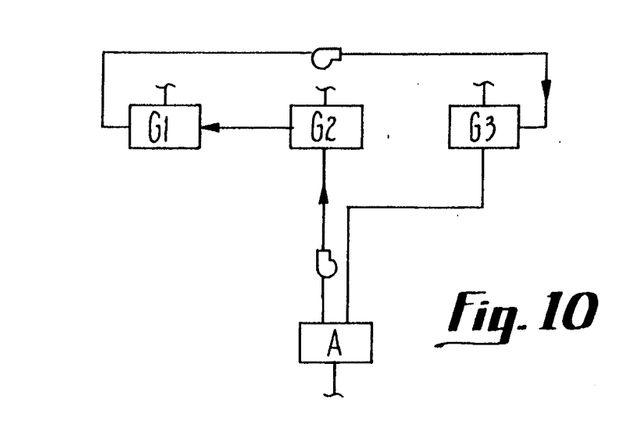
Figure 11:
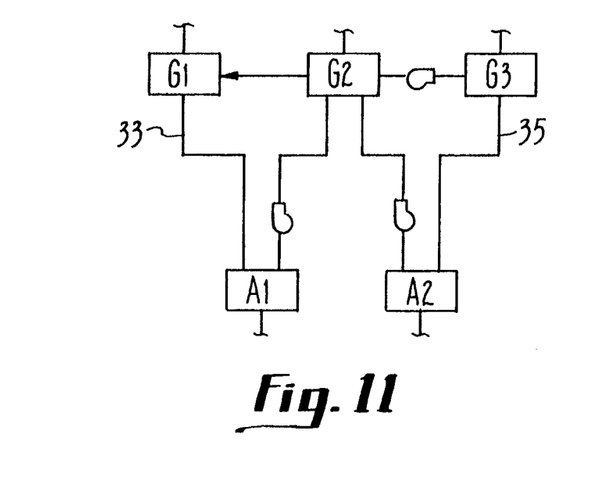
FIGS. 11 and 12 schematically illustrate examples of three generator, two absorber system embodiments according to the invention.

FIG. 8 illustrates yet another useful apparatus configuration using a single absorber and a single pump 45 for absorption fluid loop 44. FIGS. 9-11 are simplified illustrations of other fluid loop alternatives. In FIGS. 9 and 10, a single absorber and single fluid loop is provided, while in FIG. 11, two absorbers are used with two fluid loops. The fluid loop solution heat exchangers have not been shown, for simplicity, nor have the condensers, which cooperate with each generator, nor the evaporator(s). Splitting the aqueous solution circuits has the advantage that the refrigerant concentration change generated in each generator can be designed for being optimized for each stage and does not have to take into consideration other design criteria. FIGS. 9-11 illustrate different embodiments of splitting the solution circuits. In FIG. 9, the fluid is routed such that it is directed from the absorber to generator $G_2$ prior to $G_3$, which has the advantage that a heat and mass transfer additive present in the solution, which is possibly not stable at generator $G_3$ temperatures, can be easily flushed off or separated in generator $G_2$. However, such an option requires an additional pump for the solution to generator $G_3$, which operates at a higher pressure. Yet another alternative is illustrated in FIG. 10 in which the solution is pumped from the absorber first to generator $G_2$, and then successively to $G_1$ and then finally to $G_3$. Yet another alternative is illustrated in FIG. 11, in which two absorbers $A_1$ and $A_2$ are used, each having a separate circuit 33 and 35, respectively, for directing working fluid to and from three generators $G_1$, $G_2$ and $G_3$. Again, the flows between the generators may be selected such that the solution may be routed through the three generators, and split between the two absorbers.

Figure 12:
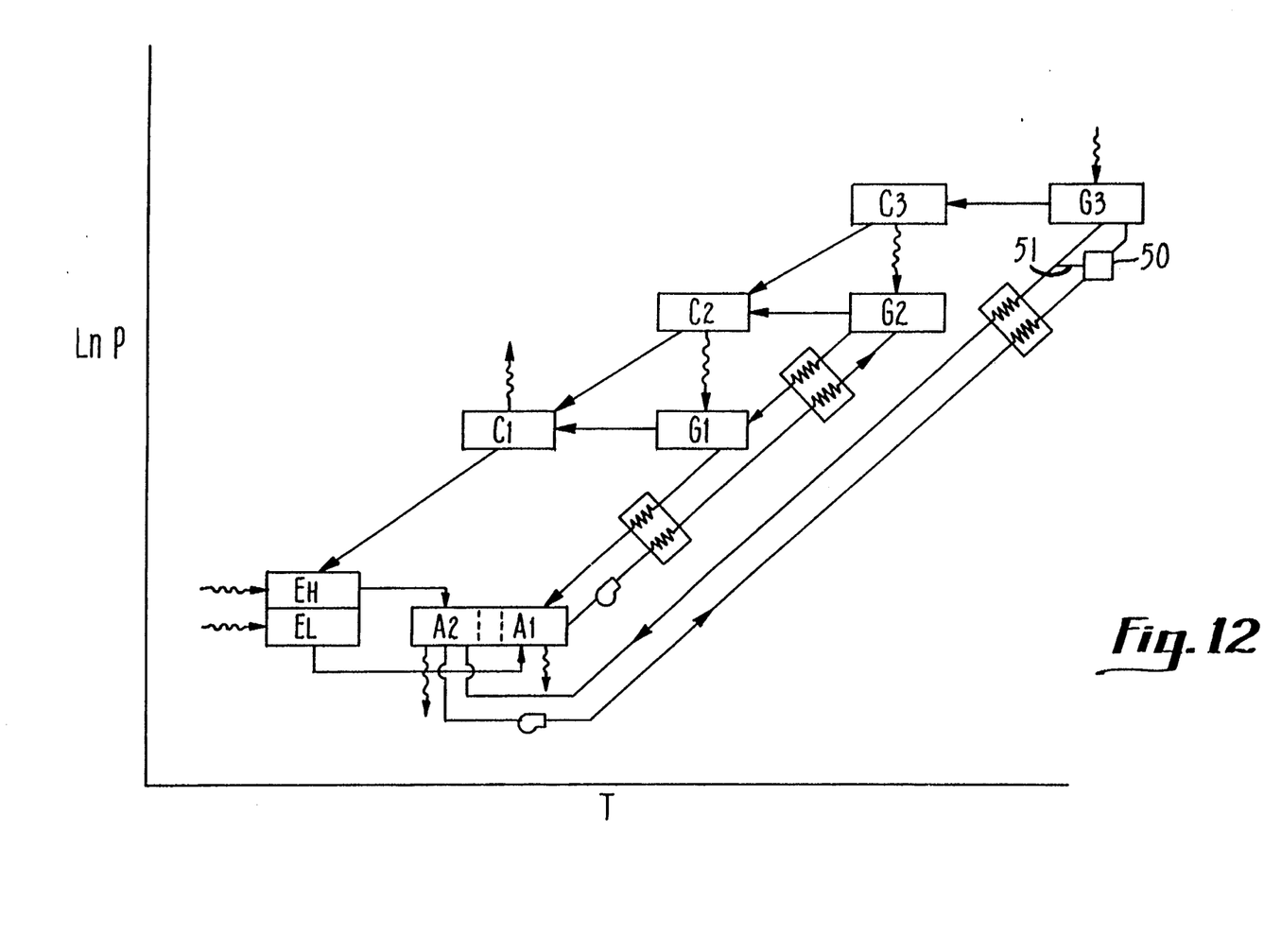

FIG. 12 illustrates another apparatus alternative using two absorption fluid loops and two absorbers, $A_1$, which feeds intermediate and low stage generators $G_2$ and $G_1$ along a first loop, and $A_2$ feeding high temperature generator $G_3$ along a second loop. The temperature ranges of the absorbers may overlap as illustrated by the dotted lines between the absorbers. One or two evaporators may be used in such a configuration. By proper use of evaporator/absorber pairing the $\Delta P$, i.e., the evaporator pressure minus the absorber pressure, will be sufficient to result in a relatively rapid sorption at low salt concentration, with the advantage that the need for a heat and mass transfer additive may not be required in the high temperature loop. A second evaporator may also be used, as shown with high pressure evaporator $E_H$ feeding $A_2$ and low pressure evaporator $E_L$ feeding $A_1$. It should also be appreciated that the specific absorber-generator absorption fluid loops shown illustrates only one example of such a loop, and a number of other combinations of absorber-generator, two loop configurations evident to those skilled in the art may be used. FIG. 5 and 12 show embodiments using separate solution loops. Such configurations can take advantage of the common refrigerant, water, and the separate solution cycles by using different absorbents or different absorbent concentrations in different solution cycles. The cycle of FIG. 12, if operated with two evaporators and two absorbers can take advantage of using the higher temperature evaporator in conjunction with the absorber connected to the high temperature generator $G_3$ such that the absorbent concentration in its solution is relatively low, the operating and differential pressure between this evaporator and absorber is relatively high, and resulting heat and mass transfer in the absorber is improved, and may eliminate the need for a heat and mass transfer additive in the high temperature solution cycle. It is known that such conditions yield higher absorber heat and mass transfer rates. In general, separate solution loops allow for use of different absorbents or different absorbent concentrations as long as the same refrigerant is used.

Solution heat exchange may be accomplished with conventional tube or plate heat exchangers and maximum efficiency reached by optimizing the temperature approach between entering and exiting solutions. It will be understood that in any of the system configurations within the invention, such a solution heat exchange between the generators and absorber or absorbers is to be used. If multiple absorption fluid loops are used, solution heat exchange may not be limited to heat exchange within each loop, but may incorporate energy exchange between different fluid loops. For example, high temperature fluid heats lower loop fluid after the higher temperature fluid performs its main function to preheat the medium temperature fluid. Excess heat may be available from cost driven design tradeoffs in the solution heat exchangers as well as from the difference in specific heat capacity and mass flow between the concentrated and dilute refrigerant solutions entering or exiting the generators, respectively, as well as the exit generator temperatures.

As previously described, a single refrigerant, water, is used in the aqueous absorption fluid throughout the apparatus of the invention, regardless of the absorber-generator groupings or absorber fluid loop or loops and is used in all stages of the triple effect cycle carried out in the system. However, different salts or combination of salts, or different concentrations of the same salts, can be used in the different fluid loops. The aqueous absorption fluids which may be used in the present invention comprise aqueous solutions of LiBr, LiCl, LiI, $LiNO_2$, LiCNS, and $LiClO_3$ and mixtures thereof. Preferred fluids operating in the high stage generator comprise LiBr - LiCNS, LiBr - LiI, LiBr - $LiClO_3$, LiBr - $LiNO_2$, LiCl - LiI, LiCl - $LiNO_2$ and LiCl - $LiClO_3$. Other useful fluids are aqueous mixtures of one of the group LiBr, LiCl and LiI, together with a second salt of the group $Ni(NO_3)_2$, $CaBr_2$, $FeCl_2$ and $MnI_2$. Another useful salt group is $ZnBr_2$ combined with $CaBr_2$. Suitable concentrations of LiBr, LiCl or their mixtures are between about 58% and about 68%±2%, by weight, while in the third stage, a lower concentration of LiBr, about 55% or less, is used. The remaining salts may be used in any stage in concentrations of between about 40% up to about 75%. However, the high concentration will be limited by the salt crystallization limit. Yet another useful salt group comprises NaOH, KOH, or mixtures thereof. Suitable concentrations of about 40% up to the crystallization limit may be used, and where mixtures are used, relative proportions of between 40% and 60% NaOH and 60–40% KOH respectively, are preferred. Where LiBr, LiCl or mixtures thereof are used in stage one or in stages one and two, in stage three, a lower concentration of LiBr, or any of the other described salts or combinations are preferred.

Lithium corrosion inhibitors are especially useful with the aforesaid lithium salt compositions. Suitable corrosion inhibitors, include for example, lithium molybdate, lithium nitrate or lithium chromate. Ph adjustments may be made, for example, using LiOH. Because of the high temperatures and salt concentrations of the absorption fluids in the third stage generator it may be desirable to use corrosion resistant components or materials. Thus, for example, nickel-chromium alloys or nickel-copper or other non-ferrous alloys for construction of the high stage generator are preferred.

It is also desirable to use heat and mass transfer additives in the aqueous absorption fluids. Particularly useful additives include alcohols having between about 6 and about 10 carbon atoms, for example, 2-ethylhexanol and n-octanol. Aliphatic and aromatic amines such as nonylamine or benzylamine or its derivatives may also be used. Effective concentration ranges are from about 10 parts per million up to about 2000 ppm. It is desirable to separate the heat and mass transfer additive from the aqueous absorption fluid prior to entering the third stage generator. The heat and mass transfer additives are only slightly soluble or are insoluble in the aqueous salt solutions, and thus form a second phase, typically floating on the heavier aqueous solution highly desirable in the absorber(s). However, because these additives are not normally stable at high temperature generator temperatures, the use of a mechanical separator or skimmer, or other means for separating these heat and mass transfer additives prior to entry into the high temperature generator is desirable. For example, in FIG. 7, a mechanical skimmer 40 is illustrated which provides such separation where the aqueous solution is directed from lower temperature generators to high temperature generator $G_3$. Alternatively, such separation may be achieved by providing an accumulation chamber which avoids solution pumping from the surface where the heat and mass transfer additive collects. Another means for separating the additive is by use of a flash chamber in the lower temperature generator $G_2$, or in such a chamber located along the fluid loop prior to entering the high temperature generator. For example, observing also FIGS. 9–11, by routing the absorption fluid such that it passes through generator $G_2$ prior to $G_3$, has the advantage that the heat and mass transfer additive can be easily flushed off from generator $G_2$. This option, however, does require an additional pump for pumping solution to generator $G_3$ which operates at higher pressure. Regardless of the type of separator used, it should preferably reduce the amount of additive present in the aqueous absorption fluid to about or substantially to the solubility limit of the additive. Means should also be provided for returning the separated additive into the fluid in or just prior to entry into the absorber. Thus, as shown in FIG. 12, the separator 50 may be provided with a return conduit 51 for supplying the additive separated from the fluid prior to entry into the high stage generator $G_3$ back to the loop after it leaves $G_3$.

It may also be desirable to incorporate a conventional purger in the system of the invention, for removing air or other non-condensable gases in the aqueous absorption fluid loop. Such equipment and its use in absorption systems is well known to those skilled in the art. The systems may also be designed using a heat and mass additive transfer reservoir and means for introducing the additive into the absorber(s). Because of gradual decomposition of the additive over time, means for periodically injecting a metered replacement amount of the additive to maintain suitable concentrations in the fluid in or prior to the absorber(s) will also be preferred. This requires that the heat and mass transfer additive decomposition products are purgable as is the case, for example, with 2-ethylhexanol.

Suitable heat transfer fluids used for heat transfer between components of the apparatus include water, heat transfer oil, Dowtherm ® fluids, water/glycol mixtures, etc. If the high temperature generator is steam fired, the condensate may be used for heating purposes at lower temperatures in the system.

The significant advantage of the cycle and system of the present invention is in the requirement of only a single refrigerant allowing for heat transfer and mass exchange coupling. The result is that no working fluid is required having an evaporator/absorber temperature lift of 130° F. from about 50° F. evaporator temperature to about 180° F. solution equilibrium temperature. Moreover, the lowest useful operating temperature will be lower than required in a dual loop cycle since the temperature spread required between condenser and generator is proportional to the spread between the evaporator and absorber. Moreover, the highest temperature stage portion of the present invention operates with conventional evaporator/absorber temperature lifts of between about 45° F. and about 90° F., and the highest stage condensing temperature needs only to be sufficient to drive the second stage generator, which could operate as low as 300° F. Such conditions lead to minimal generator temperature requirements for the third stage of between about 390° F. and 420° F., depending on operating conditions and heat exchange surfaces used, which is lower than expected for a dual loop triple effect system which is currently estimated to be between about 440° F. and 460° F. at the lowest. These as well as other advantages of the system will be evident to those skilled in the art.

We claim:

1. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one, two or three absorbers and one, two or three fluid loops cooperating therewith for directing aqueous absorption fluid between said one, two or three absorbers and any one or more of said first, second and third generators;

second heat exchange means cooperating with said fluid loops for exchanging energy between aqueous absorption fluid flows in said loops; and one, two or three evaporators operatively communicating with said one, two or three absorbers, respectively; and said aqueous absorption fluid in each of said fluid loops, respectively, comprising an aqueous salt solution of one of the following groups of salts:
(a) $LiNO_2$, $LiCNS$, $LiClO_3$, $LiI$ and mixtures thereof;
(b) $LiBr$, $LiCl$ or $LiI$, and a salt selected from $Ni(NO_3)_2$, $CaBr_2$, $FeCl_2$ and $MnI_2$;
(c) a mixture of $ZnBr_2$ and $CaBr_2$;
(d) $NaOH$, $KOH$, and mixtures thereof; or
(e) $LiNO_2$, $LiCNS$, $LiClO_3$, or $LiI$, and mixtures thereof with $LiBr$, $LiCl$ or mixtures thereof.

2. The apparatus of claim 1 including combustion air heating means for heating said third generator, and means for directing excess heat from said combustion air heating for combustion air pre-heating.

3. The apparatus of claim 1, including combustion air heating means for heating said third generator and wherein said first heat exchange means includes means for thermally linking said third generator heating means in fluid heat transfer communication for directing exhaust heat to one or both of said first and second generators.

4. The apparatus of claim 1 wherein one of said fluid loops directs said aqueous absorption fluid from one of said absorbers to said third generator, and including two single stage pumps or a two stage pump for pumping said fluid from said absorber to said third generator.

5. The apparatus of claim 1, said aqueous absorption fluid having a heat and mass transfer additive therein comprising an alcohol having between about 6 and about 10 carbon atoms, or an aliphatic or aromatic amine; and
a reservoir containing said heat and mass transfer additive, wherein said reservoir is in communication with one or more said fluid loops for directing said heat and mass transfer additive to said one or more fluid loops before said aqueous absorption fluid enters said one, two or three absorbers.

6. A triple effect absorption cycle apparatus, comprising:
first, second and third generators each containing an aqueous absorption fluid and operating at successively higher temperatures, respectively;
first, second and third condensers operating at successively higher temperatures, respectively, and operatively communicating with said first, second and third generators, respectively;
first heat exchange means cooperating between said third condenser and said second generator, and between said second condenser and said first generator, for directing energy therebetween, respectively;
one, two or three absorbers and one, two or three fluid loops cooperating therewith for directing aqueous absorption fluid between said one, two or three absorbers any one or more of and said first, second and third generators;
second heat exchange means cooperating with said fluid loops for exchanging energy between aqueous absorption fluid flows in said loops; and
one, two or three evaporators operatively communicating with said one, two or three absorbers, respectively;
said first heat exchange means including a heat transfer loop for directing a heat transfer fluid successively from said third condenser, to said second generator, to said first generator, to said second condenser and return to said third condenser.

7. The apparatus of claim 6 including combustion air heating means for heating said third generator, and means for directing excess heat from said combustion air heating for combustion air pre-heating.

8. The apparatus of claim 6, including combustion air heating means for heating said third generator and wherein said heat transfer loop includes means for thermally linking said third generator heating means in fluid heat transfer communication with said heat transfer loop for directing exhaust heat to one or both of said first and second generators.

9. The apparatus of claim 6 wherein one of said fluid loops directs said aqueous absorption fluid from one of said absorbers to said third condenser, and including two single stage pumps or a two stage pump for pumping said fluid from said absorber to said third generator.

10. The apparatus of claim 6 wherein said aqueous absorption fluid comprises $LiBr$, $LiCl$, or mixtures thereof, and contains a heat and mass transfer additive therein comprising an alcohol having between about 6 and about 10 carbon atoms, or an aliphatic or aromatic amine, and wherein the concentration of said heat and mass transfer additive in said high temperature generator is substantially the same or less than the solubility limit of said additive in said aqueous absorption fluid.

11. A triple effect absorption cycle apparatus, comprising:
first, second and third generators each containing an aqueous absorption fluid and operating at successively higher temperatures, respectively;
first, second and third condensers operating at successively higher temperatures, respectively, and operatively communicating with said first, second and third generators, respectively;
first heat exchange means cooperating between said third condenser and said second generator, and between said second condenser and said first generator, for directing energy therebetween, respectively;
two or three absorbers and one, two or three fluid loops cooperating therewith for directing aqueous absorption fluid between said two or three absorbers and any one or more of said first, second and third generators;

second heat exchange means cooperating with said fluid loops for exchanging energy between aqueous absorption fluid flows in said loops; and two or three evaporators and operative connection means therebetween for directing refrigerant therebetween, said two or three evaporators operatively communicating with said two or three absorbers, respectively.

12. The apparatus of claim 11, wherein the two or three evaporators and said two or three absorbers are used at different operating temperatures, wherein the salt concentration of the aqueous absorption fluid is successively greater in said two absorbers, or in said three absorbers, respectively, and wherein the highest temperature evaporator is in operative communication with the absorber containing the aqueous absorption fluid having the greatest absorbent salt concentration.

13. The apparatus of claim 11 including combustion air heating means for heating said third generator, and means for directing excess heat from said combustion air heating for combustion air pre-heating.

14. The apparatus of claim 11, including combustion air heating means for heating said third generator and wherein said first heat exchange means includes means for thermally linking said third generator heating means in fluid heat transfer communication for directing exhaust heat to one or both of said first and second generators.

15. The apparatus of claim 11 wherein said aqueous absorption fluid comprises LiBr, LiCl, or mixtures thereof, and contains a heat and mass transfer additive therein comprising an alcohol having between about 6 and about 10 carbon atoms, or an aliphatic or aromatic amine, and wherein the concentration of said heat and mass transfer additive in said high temperature generator is substantially the same or less than the solubility limit of said additive in said aqueous absorption fluid.

16. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one, two or three absorbers and one, two or three fluid loops cooperating therewith for directing aqueous absorption fluid between said one two or three absorbers and any one or more of said first, second and third generators;

second heat exchange means cooperating with said fluid loops for exchanging energy between aqueous absorption fluid flows in said loops; and one, two or three evaporators operatively communicating with said one, two or three absorbers, respectively;

said aqueous absorption fluid having a heat and mass transfer additive therein comprising an alcohol having between about 6 and about 10 carbon atoms, or an aliphatic or aromatic amine; and separation means cooperating with said fluid loop directing said aqueous absorption fluid to said third generator for separating said heat and mass transfer additive from said aqueous absorption fluid before it enters said third generator.

17. The apparatus of claim 16, wherein said heat and mass transfer additive is slightly soluble or substantially insoluble in said aqueous absorption fluid and has a lower density than water, and wherein said separation means comprises a skimmer for separating said additive floating on the surface of said aqueous absorption fluid.

18. The apparatus of claim 16, wherein said separation means comprises a flash chamber for flashing said heat and mass transfer additive from said aqueous absorption fluid.

19. The apparatus of claim 16, wherein said separation means comprises said second generator operating at a temperature sufficient to flash off said heat and mass transfer additive from said aqueous absorption fluid.

20. The apparatus of claim 16 wherein said third stage generator is at least partly constructed of a nickel-chromium or nickel-copper alloy.

21. The apparatus of claim 20 wherein the aqueous absorption fluid comprises LiBr, LiCl or mixtures thereof.

22. The apparatus of claim 16 wherein said aqueous absorption fluid in each of said fluid loops, respectively, comprises an aqueous salt solution of one of the following groups of salts:

(a) LiBr, LiCl, $LiNO_2$, LiCNS, $LiClO_3$, LiI and mixtures thereof;
(b) LiBr, LiCl or LiI, and a salt selected from $Ni(NO_3)_2$, $CaBr_2$, $FeCl_2$ and $MnI_2$;
(c) a mixture of $ZnBr_2$ and $CaBr_2$; or
(d) NaOH, KOH, and mixtures thereof, and wherein the concentration of said heat and mass transfer additive in said high temperature generator is substantially the same or less than the solubility limit of said additive in said aqueous absorption fluid.

23. The apparatus of claim 16 including a reservoir containing said heat and mass transfer additive, wherein said reservoir is in communication with one or more said fluid loops for directing said heat and mass transfer additive to said one or more fluid loops before said aqueous absorption fluid enters said one, two or three absorbers.

24. The apparatus of claim 23 wherein said aqueous absorption fluid comprises LiBr, LiCl, or mixtures thereof, and wherein the concentration of said heat and mass transfer additive in said high temperature generator is substantially the same or less than the solubility limit of said additive in said aqueous absorption fluid.

25. The apparatus of claim 16 including purging means cooperating with one or more of said fluid loops for removing heat and mass transfer additive purgeable decomposition products from said aqueous absorption fluid.

26. The apparatus of claim 16 wherein said separation means includes conduit means for returning separated heat and mass transfer additives to said aqueous absorption fluid after it leaves said third generator.

27. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

two or three absorbers and at least one fluid loops cooperating therewith for directing aqueous absorption fluid between said two or three absorbers and said first, second and third generators;

second heat exchange means cooperating with said fluid loops for exchanging energy between aqueous absorption fluid flows in said loops; and two or three evaporators and operative communicating with said two or three absorbers, respectively;

said fluid loop operatively connecting said first, second and third generators in series, and pump means cooperating therebetween for successively directing said aqueous absorption fluid therebetween.

28. The apparatus of claim 27 comprising a single absorber and at least one fluid loop operatively connected thereto for directing said aqueous absorption fluid therefrom successively to said third generator, said second generator and said first generator.

29. The apparatus of claim 27 comprising two absorbers, wherein the salt concentration of the aqueous absorption fluid in the second of said absorbers is greater than the first of said absorbers, and wherein one of said fluid loops connects said second absorber to said third generator for directing aqueous absorption fluid thereto.

30. The apparatus of claim 27 wherein one of said fluid loops connects said first absorber to said second generator for directing aqueous absorption fluid thereto.

31. The apparatus of claim 27 comprising two absorbers, wherein the salt concentration of the aqueous absorption fluid in the second of said absorbers is greater than in the first of said absorbers, and wherein one of said loops connects said second absorber to said second generator for directing aqueous absorption fluid thereto.

32. The apparatus of claim 31, wherein said fluid loop connecting said second absorber to said second generator also connects said second generator to said third generator, and said third generator to said second absorber.

33. The apparatus of claim 32, wherein said aqueous absorption fluid includes a heat and mass transfer additive slightly soluble or substantially insoluble therein comprising an alcohol having 6 or more carbon atoms or an aliphatic or aromatic amine, and including separation means for separating said additive from said aqueous absorption fluid before it enters said third generator.

34. The apparatus of claim 33, wherein said separation means comprises means for flashing said heat and mass transfer additive in said second generator or in cooperation with said fluid loop connecting said second and third generators.

35. The apparatus of claim 29, including a fluid loop for directing aqueous absorption fluid from said first absorber to said first generator.

36. The apparatus of claim 27, wherein said fluid loop is operatively connected to said generator for directing said aqueous absorption fluid successively from said first generator to said second generator, and from said second generator to said third generator.

37. The apparatus of claim 27 wherein said aqueous absorption fluid comprises LiBr, LiCl, or mixtures thereof, and wherein the concentration of said heat and mass transfer additive in said high temperature generator is substantially the same as the solubility limit of said additive in said aqueous absorption fluid.

38. The apparatus of claim 27 wherein one of said fluid loops directs said aqueous absorption fluid from one of said absorbers to said third generator, and including two single stage pumps or a two stage pump for pumping said fluid from said absorber to said third generator.

39. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one or more first absorbers cooperating with one or more first fluid loops for supplying aqueous absorption fluid to said first and second generators, and one or more second absorbers cooperating with one or more second fluid loops for supplying aqueous absorption fluid to said third generator;

second heat exchange means cooperating with said fluid loops for exchanging energy between aqueous absorption fluid flows in said loops; and one, two or three evaporators operatively communicating with said one, two or three absorbers, respectively.

40. The apparatus of claim 39 wherein said aqueous absorption fluid in said one or more first absorbers comprises LiBr, LiCl or mixtures thereof, and wherein said aqueous absorption fluid in said one or more second absorbers comprises an aqueous solution of LiBr at a concentration of bout 55% or less, or comprises an aqueous solution of one of the following groups of salts:

(a) LiCl, LiNO$_2$, LiCNS, LiClO$_3$, LiI and mixtures thereof;
(b) LiBr, LiCl or LiI, and a salt selected from Ni(NO$_3$)$_2$, CaBr$_2$, FeCl$_2$ and MnI$_2$;
(c) a mixture of ZnBr$_2$ and CaBr$_2$;
(d) NaOH, KOH, and mixtures thereof; or
(e) LiNO$_2$, LiCNS, LiClO$_3$, or LiI, and mixtures thereof, with LiBr, LiCl or mixtures thereof.

41. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one, two or three absorbers and one, two or three fluid loops cooperating therewith for directing aqueous absorption fluid between said one, two or three absorbers and said first, second and third generators;

second heat exchange means cooperating with said fluid loops for exchanging energy between aqueous absorption fluid flows in said loops;

one, two or three evaporators operatively communicating with said one, two or three absorbers, respectively; and wherein one of said fluid loops is operatively connected to said generators for directing said aqueous fluid successively from said second generator to said third generator, and from said third generator to said first generator.

42. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one, two or three absorbers and one, two or three fluid loops cooperating therewith for directing aqueous absorption fluid between said one, two or three absorbers and said first, second and third generators;

second heat exchange means cooperating with said fluid loops for exchanging energy between aqueous absorption fluid flows in said loops;

one, two or three evaporators operatively communicating with said one, two or three absorbers, respectively; and wherein one said fluid loops is operatively connected to said generators for directing said aqueous fluid successively from said second generator to said first generator, and from said first generator to said third generator.

43. The apparatus of claim 1 wherein said aqueous absorption fluid in all of said fluid loops comprises an aqueous solution of the same salt composition.

44. The apparatus of claim 11 wherein each of said two or three absorbers includes means capable of reflecting heat of absorption at temperatures less than the operating temperature of the lowest operating temperature generator.

45. The apparatus of claim 11 including operative means connecting said first condenser with any one or all of said two or three evaporators for directing condensed refrigerant thereto.

46. The apparatus of claim 12 wherein said refrigerant is directed successively from the highest temperature evaporator to the lowest temperature evaporator of said two or three evaporators.

47. The apparatus of claim 12 including operative means connecting said third, second and first condensers for directing condensed refrigerant successively therebetween.

48. The apparatus of claim 47 including operative means connecting said first condenser with any one or all of said two or three evaporators for directing condensed refrigerant thereto.

49. The apparatus of claim 39 wherein the aqueous absorption fluid supplied to said first and second generators comprises an aqueous composition of a first salt composition, and wherein the aqueous absorption fluid supplied to said third generator comprises an aqueous composition of a second salt composition.

50. The apparatus of claim 39 wherein the aqueous absorption fluid supplied to said first and second generators comprises an aqueous solution of a salt composition having a first salt concentration in said one or more first absorbers and wherein the aqueous absorption fluid supplied to said third generator comprises an aqueous solution of said salt composition having a second salt concentration in said one or more second absorbers.

51. A triple effect absorption cycle apparatus, comprising:

first, second and third generators each containing an aqueous absorption fluid and operating at successively higher temperatures, respectively;

first, second and third condensers operating at successively higher temperatures, respectively, and operatively communicating with said first, second and third generators, respectively;

first heat exchange means cooperating between said third condenser and said second generator, and between said second condenser and said first generator, for directing energy therebetween, respectively;

one, two or three absorbers and one, two or three fluid loops cooperating therewith for directing aqueous absorption fluid between said one, two or three absorbers and any one or more of said first, second and third generators;

second heat exchange means cooperating with said fluid loops for exchanging energy between aqueous absorption fluid flows in said loops; and one, two or three evaporators operatively communicating with said one, two or three absorbers, respectively; and operative means connecting said third, second and first condensers for directing condensed water refrigerant successively therebetween.

52. The apparatus of claim 51 comprising two or three absorbers cooperating with said one, two or three fluid loops for directing aqueous absorption fluid between said two or three absorbers and said first, second and third generators; and two or three evaporators and operative connection means therebetween for directing refrigerant therebetween, said two or three evaporators operatively communicating with said two or three absorbers, respectively.

53. The apparatus of claim 52 including operative means connecting said first condenser with any one or all of said two or three evaporators for directing condensed refrigerant thereto.

54. The apparatus of claim 53 wherein said refrigerant is directed successively from the highest temperature evaporator to the lowest temperature evaporator of said two or three evaporators.

55. The apparatus of claim 51 wherein said aqueous fluid in each of said fluid loops, respectively, comprises an aqueous salt solution of one of the following groups of salts:

(a) $LiNO_2$, $LiCNS$, $LiClO_3$, $LiI$ and mixtures thereof;
(b) $LiBr$, $LiCl$ or $LiI$, and a salt selected from $Ni(NO_3)_2$, $CaBr_2$, $FeCl_2$ and $MnI_2$;
(c) a mixture of $ZnBr_2$ and $CaBr_2$;
(d) $NaOH$, $KOH$, and mixtures thereof; or
(e) $LiNO_2$, $LiCNS$, $LiClO_3$, or $LiI$, and mixtures thereof with $LiBr$, $LiCl$ or mixtures thereof.

56. The apparatus of claim 52 wherein said aqueous absorption fluid in each of said fluid loops, respectively, comprises an aqueous salt solution of one of the following groups of salts:

(a) $LiNO_2$, $LiCNS$, $LiClO_3$, $LiI$ and mixtures thereof;
(b) $LiBr$, $LiCl$ or $LiI$, and a salt selected from $Ni(NO_3)_2$, $CaBr_2$, $FeCl_2$ and $MnI_2$;
(c) a mixture of $ZnBr_2$ and $CaBr_2$;
(d) $NaOH$, $KOH$, and mixtures thereof; or
(e) $LiNO_2$, $LiCNS$, $LiClO_3$ or $LiI$, and mixtures thereof with $LiBr$, $LiCl$ or mixtures thereof.

57. The apparatus of claim 51 wherein said first heat exchange means includes a heat transfer loop for directing a heat transfer fluid successively from said third condenser, to said second generator, to said first generator, to said second condenser and returned to said third condenser.

58. The apparatus of claim 52 wherein said first heat exchange means includes a heat transfer loop for directing a heat transfer fluid successively from said third condenser, to said second generator, to said first generator, to said second condenser and returned to said third condenser.

59. The apparatus of claim 51 wherein said aqueous absorption fluid includes a heat and mass transfer additive therein comprising an alcohol having between about 6 and about 10 carbon atoms, or an aliphatic or aromatic amine, and wherein said apparatus includes separation means cooperating with said fluid loop directing said aqueous absorption fluid to said third generator for separating said heat and mass transfer additive from said aqueous absorption fluid before it enters said third generator.

60. The apparatus of claim 52 wherein said aqueous absorption fluid includes a heat and mass transfer additive therein comprising an alcohol having between about 6 and about 10 carbon atoms, or an aliphatic or aromatic amine, and wherein said apparatus includes separation means cooperating with said fluid loop directing said aqueous absorption fluid to said third generator for separating said heat and mass transfer additive from said aqueous absorption fluid before it enters said third generator.

61. The apparatus of claim 55 wherein said aqueous absorption fluid includes a heat and mass transfer additive therein comprising an alcohol having between about 6 and about 10 carbon atoms, or an aliphatic or aromatic amine, and wherein said apparatus includes separation means cooperating with said fluid loop directing said aqueous absorption fluid to said third generator for separating said heat and mass transfer additive from said aqueous absorption fluid before it enters said third generator.

* * * * *